T. B. JORGENSEN.
MIXING DEVICE.
APPLICATION FILED OCT. 21, 1912.
1,125,337.
Patented Jan. 19, 1915.
2 SHEETS—SHEET 2.
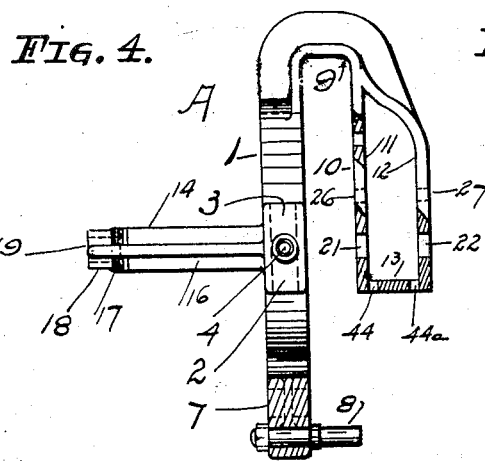
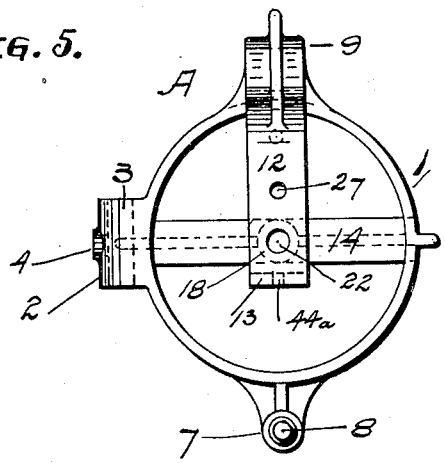
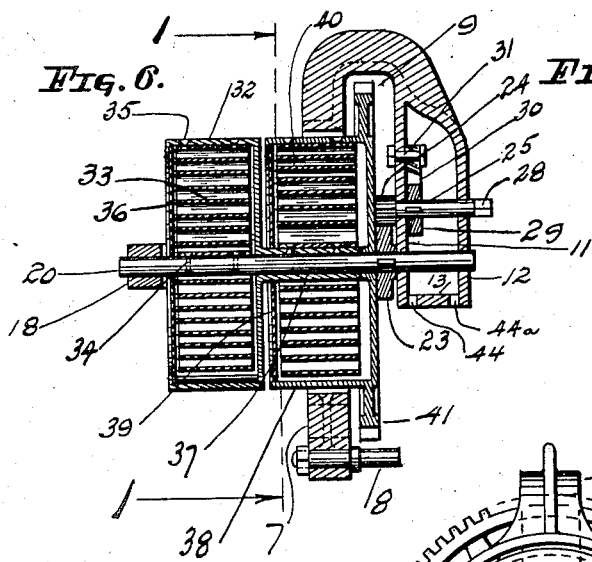
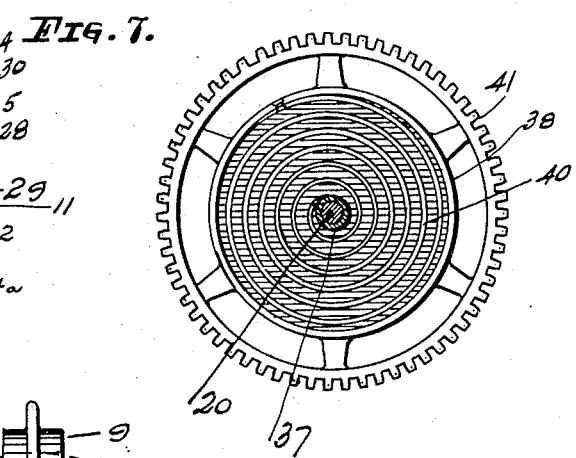
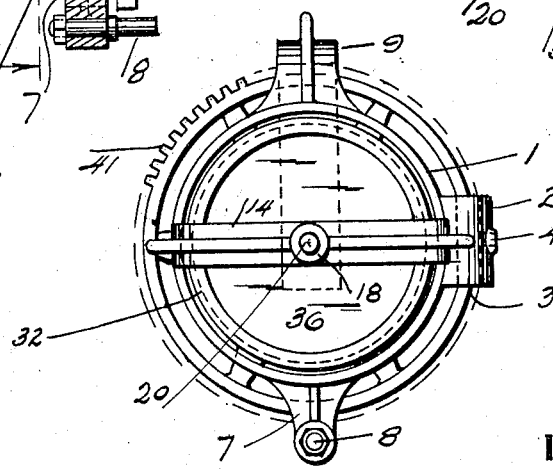
Witnesses:
Inventor:

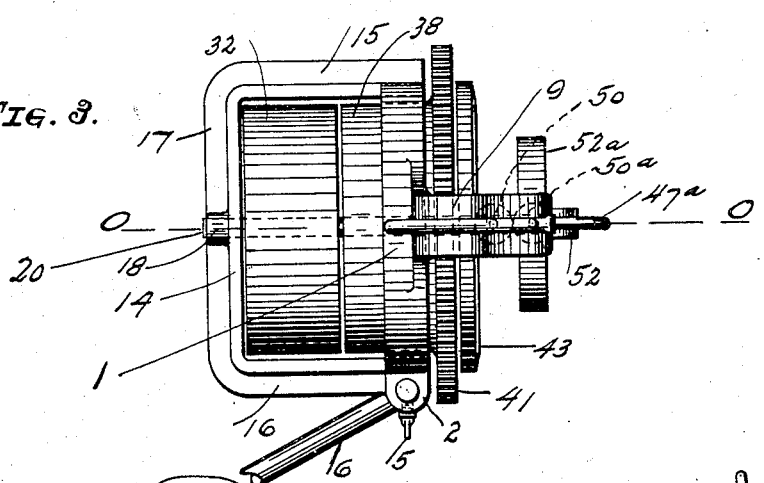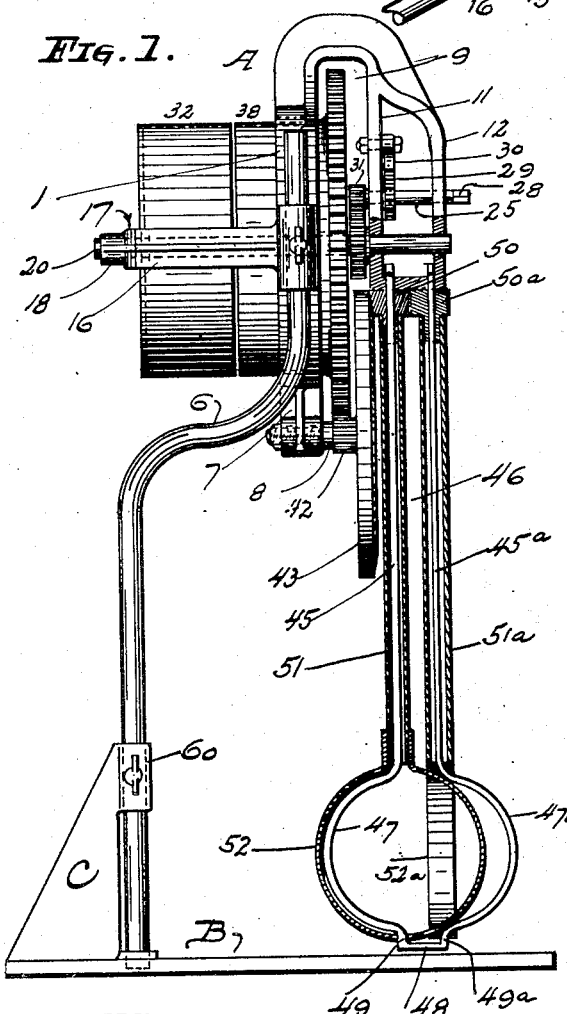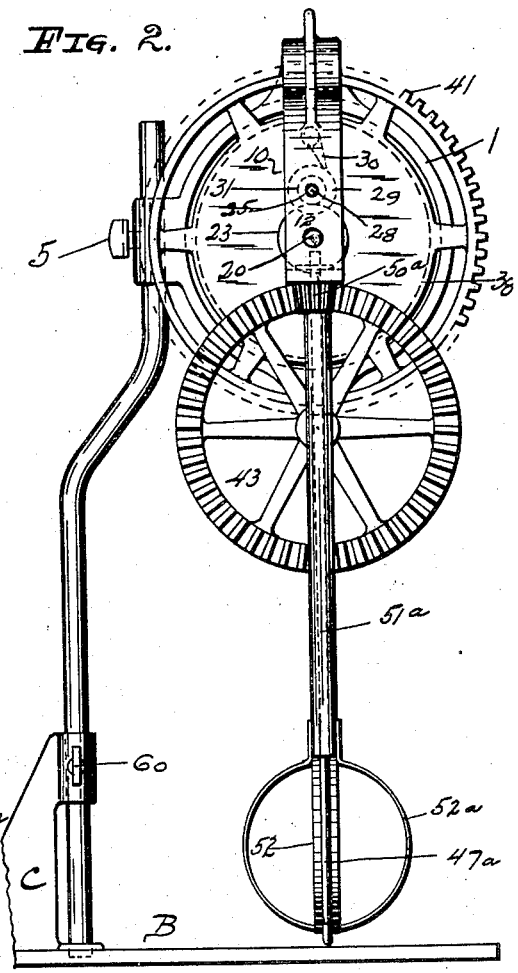

UNITED STATES PATENT OFFICE.

THORLEIF B. JORGENSEN, OF CHICAGO, ILLINOIS.

MIXING DEVICE.

1,125,337. Specification of Letters Patent. Patented Jan. 19, 1915.

Application filed October 21, 1912. Serial No. 726,974.

*To all whom it may concern:*

Be it known that I, THORLEIF BJARNE JORGENSEN, a subject of the King of Norway, and a resident of the city of Chicago, in the county of Cook and State of Illinois, have invented certain new and useful Improvements in Mixing Devices; and I do hereby declare that the following description of my said invention, taken in connection with the accompanying sheet of drawings, forms a full, clear, and exact specification, which will enable others skilled in the art to which it appertains to make and use the same.

This invention has general reference to mixing devices for household, restaurant, bakery, café and analogous uses in the beating up of eggs or frostings or the mixing of liquids of various kinds, and it consists, essentially, in the novel and peculiar combination of parts and details of construction as hereinafter first fully set forth and described and then pointed out in the claims.

The object of my invention is the production of a durable, efficient, and cheaply constructed mixer of the class described which is actuated by the means of spiral springs or the like, to replace the manually operated devices now in use.

In the drawings already referred to, which serve to illustrate my said invention more fully, Figure 1 is a side elevation of my newly invented mixing device and Fig. 2, a front view of the same. Fig. 3 is a plan with certain parts broken away. Fig. 4 is a side elevation of the frame or housing of the device, certain parts being shown in section to better illustrate details of construction, and Fig. 5, a front view thereof. Fig. 6 is a longitudinal, vertical section in line 0 0 of Fig. 1, with certain details eliminated. Fig. 7 is a transverse, vertical section of a detail of construction as taken in line 1 1 of Fig. 6. Fig. 8 is a rear view of Fig. 6.

Like parts are designated by corresponding symbols or characters of reference in all the figures of the drawings.

A, best seen in Figs. 4 and 5, represents the frame or housing of my mixing device and it comprises an annular band or casting 1, having at its periphery a tangential, perpendicularly disposed boss 2, which is possessed of a central aperture 3, and a threaded or tapped cross opening 4 in communication therewith; the latter for the reception of a thumb screw 5, by means of which an upstanding rod or standard 6 may be held in fixed position in central aperture 3 already mentioned. Depending from said annular band 1, in alinement with a vertical line drawn through the center of said band, is a lug 7, in which is fixedly fastened a horizontal, outwardly projecting stud 8 for purposes hereinafter described. Extending upwardly from the periphery of said band, at a point diametrically opposite lug 7, is arranged an upwardly and outwardly projecting yoke 9, terminating in a downwardly extending bracket 10, in front of said annular band, said bracket comprising parallel members 11 and 12, connected together at their lower extremities by an integral brace 13, all as clearly shown in Figs. 4 and 5.

Extending outwardly from opposite sides of the annular band 1, in a plane coincident to the axis of said band, is an open U-shaped yoke 14, consisting of longitudinal members 15 and 16 and a rear cross member 17. At a point axially of said band, cross member 17 is provided with a hub 18 having an axial opening 19 for the reception therein of an axially extending shaft 20, the opposite end of which shaft is supported and journaled in circular openings 21 and 22 in bracket 10. Attention is now drawn to the fact that annular band 1 with its boss 2, lug 7, yoke 9, bracket 10, and open yoke 14, in its entirety comprising the frame or housing A, is formed integrally in cast or malleable iron or steel in the process of casting, and when the parts are properly proportioned, forms an extremely light, cheap, and efficient housing for the operative elements of my invention.

On axially extending shaft 20, at a point directly adjacent member 11 of bracket 10, is keyed or otherwise fastened a spur gear 23 of suitable size, and meshing into this is a spur pinion 24, fastened to a shaft 25, rotatably mounted in openings 26 and 27 in members 11 and 12 of bracket 10 a proper distance above and parallel to axial shaft 20. Shaft 25 projects exteriorly of member 12, and terminates in a squared end 28 for application of a suitable handle or crank (not shown), by which said shaft and through it and pinion 24 and gear 23, axial shaft 20 may be rotated. Within the space inclosed by members 11 and 12 of bracket 10, on shaft 25, is located a ratchet wheel 29, which ratchet is engaged by a pawl or dog 30, pivoted to member 11 by a stud or bolt 31. The object of this ratchet and pawl is to prevent reverse rotation of shaft 20, in a manner readily understood.

Loosely mounted on shaft 20 adjacent cross bar 17 of yoke 14, is a cup shaped, cylindrical casing 32, within which is contained a flat wound spiral spring 33. The inner end of this spring is fixedly attached to shaft 20 by rivets 34, and the outer end thereof is affixed to the wall of the casing 32 by studs 35, or other similar means. The open end of casing 32 is closed by a disk 36, to prevent the ingress of dust, dirt, or other matter to the interior thereof.

Casing 32 is possessed of an outwardly extending axial sleeve 37, freely mounted on shaft 20, and on this sleeve is adapted to loosely revolve a like cup shaped casing 38, the open end of which is similarly closed by a disk 39. Within casing 38 is located a flat wound spiral spring 40, the inner end of which is fastened to sleeve 37 of casing 32, and the outer extremity, of which, to the wall of said casing 38. Said casing 38 extends through the interior of annular band 1 and has on its periphery, adjacent said band, an integrally formed spur gear 41. This gear meshes into a pinion 42, loosely mounted on stud 8 of lug 7, which pinion is integrally formed with a large bevel gear 43.

In the brace 13 of bracket 10 are provided vertical, circular openings 44 and 44ª for the reception of the upper extremities of parallel members 45 and 45ª of a guide wire 46. The lower portion of these members are bent into semicircular form in reverse direction to each other, as seen at 47 and 47ª. At the lower end, these bends terminate in a U-shaped connecting crook 48, the vertical legs 49 and 49ª of which are in a line axial with the parallel members 45 and 45ª. The upper ends of the parallel members 45 and 45ª are fixedly held in the openings 44 and 44ª by riveting or pinning, or in any other suitable manner. On these said parallel members, directly under and adjacent brace 13, are loosely journaled intermeshing pinions 50 and 50ª, the first mentioned of which also engages the bevel gear 43. Loosely embracing members 45 and 45ª, terminating at the beginning of the bends 47 and 47ª, and engaging pinions 50 and 50ª, are tubes 51 and 51ª. These tubes have at their lower ends annular mixing blades 52 and 52ª, which blades are pivoted about the vertical legs 49 and 49ª of the crook 48 of guide wire 46, as clearly seen in Figs. 1 and 2.

To support housing A and the contained mechanism of my mixing device, I provide a suitable base B having an upstanding bracket C, into which bracket, supporting rod or standard 6, hereinbefore referred to, is adapted to be freely received and fixed therein by a thumb screw 60.

The operation of my mixing device may now be described as follows:—The spiral springs 33 and 40 are first wound up by rotating shaft 28 by a suitable crank handle in an obvious manner. A bowl of the material to be mixed is then placed in position on base B and the housing A properly adjusted on standard 6 by thumb screw 5 so that the mixing blades 52 and 52ª are submerged in the mixture. Springs 33 and 40 being properly wound up, and the shaft 20 restrained from reverse rotation by the ratchet 29 and pawl 30, said springs will impart a rotary motion to spur gear 41, and, that in turn, to pinion 42, bevel gear 43, pinions 50 and 50ª, tubes 51 and 51ª, and mixing blades 52 and 52ª, in an entirely obvious manner.

Herein I have described the preferred manner of carrying my invention into effect, but I wish it understood that I may make changes in details without departing from the scope or spirit of my invention. For instance, I may employ only one large spiral actuating spring instead of two smaller ones connected in series as shown, or I may use more than two, or I may locate the ratchet shaft at the side of the axial shaft instead of above the same. All these changes are within the scope of the skilled mechanic and are to be included within the scope of my invention.

Having thus fully described my invention, I claim as new and desire to secure to me by Letters Patent of the United States:—

1. In a mixing device, a vertical member of substantially ring-like form, a horizontal yoke extending rearwardly of the member, a bracket composed of spaced vertical parts arranged in front of said member in spaced relation thereto and connected to the top of the latter in depending relation thereto, a shaft connected to the yoke and extending through said ring-like vertical member and connected to both of said bracket parts, a short shaft located above the first named shaft and journaled in said bracket parts, gear connections between the shafts located in the space between the bracket and vertical member, a pawl and ratchet for the short shaft located in the space between said bracket parts, mixing means connected to the lower ends of said vertical parts of the bracket, and a spring actuated casing projecting through said vertical member and having a gear located in the space between the bracket and vertical member and mounted on the first named shaft for operating the mixing means.

2. In a mixing device, a vertical ring-like member having a hollow bracket depending from its top and arranged in spaced relation to the front face of said member, a bearing connected to said member and located on the rear face thereof, a shaft journaled in said bearing and in said bracket and extending through said vertical member, a spring actuated drum mounted on the shaft and having a gear thereon, a pinion on the shaft, said gear and pinion being each disposed in the space between the bracket and the front face of said member, means confined in part within said bracket to operate the pinion, dasher means connected to the lower end of the bracket, and means borne by the member and actuated by the gear to drive said dasher means.

In testimony whereof I have hereunto set my hand in the presence of two subscribing witnesses.

THORLEIF B. JORGENSEN.

In the presence of—
W. HARDING,
WILLIAM O. STARK.